(12) United States Patent
Lin et al.

(10) Patent No.: US 10,827,212 B2
(45) Date of Patent: Nov. 3, 2020

(54) IMAGE TRANSMISSION EQUIPMENT AND IMAGE TRANSMISSION METHOD

(71) Applicant: DELTA ELECTRONICS, INC., Taoyuan (TW)

(72) Inventors: Botao Lin, Taoyuan (TW); Cho-Cheng Lin, Taoyuan (TW); Ya-Ting Huang, Taoyuan (TW); Wei-Chi Shih, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/038,169

(22) Filed: Jul. 17, 2018

(65) Prior Publication Data

US 2019/0045255 A1 Feb. 7, 2019

Related U.S. Application Data

(60) Provisional application No. 62/540,073, filed on Aug. 2, 2017.

(30) Foreign Application Priority Data

Dec. 14, 2017 (CN) .......................... 2017 1 1338285

(51) Int. Cl.
*H04N 7/18* (2006.01)
*H04N 21/41* (2011.01)
(Continued)

(52) U.S. Cl.
CPC ........... *H04N 21/4126* (2013.01); *H04N 7/04* (2013.01); *H04N 21/4122* (2013.01);
(Continued)

(58) Field of Classification Search
CPC ........ H04N 21/41; H04N 21/422; H04N 7/04; H04N 21/4126; H04N 21/42221; H04N 21/4122
(Continued)

(56) References Cited

U.S. PATENT DOCUMENTS 8,024,503 B2 * 9/2011 Zhang .................. H04N 5/4401
710/100
8,352,616 B2 * 1/2013 Austin .................. H04N 7/163
709/227
(Continued)

FOREIGN PATENT DOCUMENTS

CN 103141087 A 6/2013
CN 203385984 U 1/2014
(Continued)

*Primary Examiner* — Trang U Tran
(74) *Attorney, Agent, or Firm* — CKC & Partners Co., LLC (57) ABSTRACT

An image transmission method uses image transmission equipment to transmit image signals from an electronic device to a display device, the equipment which includes a base device coupled to the display device, and a peripheral device coupled to an electronic device. The base device wirelessly communicates with the peripheral device. After the electronic device obtains an image transmission program from an outside source existing outside the peripheral device and executes the image transmission program, image signals from the electronic devices can be transmitted to the display device via the peripheral device and the base device.

9 Claims, 5 Drawing Sheets

(51) Int. Cl.
*H04N 7/04* (2006.01)
*H04N 21/422* (2011.01)
*H04N 21/45* (2011.01)
*H04N 21/81* (2011.01)
*H04N 21/4363* (2011.01)

(52) U.S. Cl.
CPC . *H04N 21/42221* (2013.01); *H04N 21/43637* (2013.01); *H04N 21/4516* (2013.01); *H04N 21/8153* (2013.01); *H04N 21/8173* (2013.01)

(58) Field of Classification Search
USPC .......... 725/81, 114, 135; 348/723, 734, 552
See application file for complete search history.

(56) References Cited

U.S. PATENT DOCUMENTS

| | | | |
|---|---|---|---|
| 9,106,950 B2* | 8/2015 | Howarter | H04N 21/43615 |
| 2009/0217335 A1* | 8/2009 | Wong | H04N 21/4126 725/114 |
| 2010/0064063 A1 | 3/2010 | Option | |
| 2010/0297964 A1 | 11/2010 | Austin et al. | |
| 2010/0299712 A1* | 11/2010 | Austin | H04N 7/163 725/81 |
| 2010/0309896 A1 | 12/2010 | Sugiyama et al. | |
| 2014/0082227 A1 | 3/2014 | Beel et al. | |
| 2014/0340465 A1* | 11/2014 | Shi | H04N 7/15 348/14.03 |
| 2016/0212796 A1 | 7/2016 | Wang et al. | |

FOREIGN PATENT DOCUMENTS

| | | |
|---|---|---|
| CN | 106792494 A | 5/2017 |
| EP | 2756668 B1 | 1/2017 |
| JP | 2008090561 A | 4/2008 |
| TW | 200516394 A | 5/2005 |
| TW | I269583 B | 12/2006 |
| TW | 201206128 A | 2/2012 |
| TW | 201342914 A | 10/2013 |
| TW | M501591 U | 5/2015 |
| TW | 201628403 A | 8/2016 |
| WO | 2013/037981 A1 | 3/2013 |

* cited by examiner

IMAGE TRANSMISSION EQUIPMENT AND IMAGE TRANSMISSION METHOD

CROSS-REFERENCE TO RELATED APPLICATION

This application claims priority to U.S. Provisional Application Ser. No. 62/540,073, filed Aug. 2, 2017 and China Application Serial Number 201711338285.X, filed Dec. 14, 2017, which are herein incorporated by reference.

BACKGROUND

Technical Field

The present disclosure relates to image transmission equipment and an image transmission method. More particularly, the present disclosure is used to transmit image signals from an electronic device to a display device in order to achieve the function of image synchronization.

Description of Related Art

With the popularity of electronic device technology, academic institutions, private companies or government agencies need to set up an image transmission system at the meeting place to play slides or display monitor screen. Generally speaking, the image transmission system connects an electronic device and a projector or a monitor through a wired or wireless way, so that the screen image of the electronic device can be projected onto a screen by the projector or displayed on the monitor simultaneously for all participants.

However, the traditional image transmission system is not convenient to use. For example, the electronic device must be connected to the projector through a long cable. Or the wireless way need a complicated setting procedure in order to correctly receive image signals. Therefore, there is an urgent need for an equipment or system that is easy to build, easy to set up, and stable in transmission to overcome the aforementioned problems.

SUMMARY

The present disclosure provides an image transmission method, includes the following steps: electrically coupling a peripheral device of a wireless communication equipment to an electronic device and communicating the peripheral device and a base device of the wireless communication equipment, wherein the base device is electrically coupled to a display device. Determining whether an image transmission program applicable to the wireless communication equipment has been stored in the electronic device. If the image transmission program has not been stored in the electronic device, obtaining the image transmission program from an outside source existing outside the peripheral device. Executing the image transmission program and transmitting image signals from the electronic device, through the peripheral device and the base device, to the display device.

The present disclosure provides Image transmission equipment. The image transmission equipment includes a base device and a peripheral device. The base device has an image transmission program stored therein and is electrically coupled to a display device. The peripheral device is electrically coupled to an electronic device, and is capable of wirelessly communicating with the base device to transmit the image transmission program from the base device to the electronic device, while the image transmission program being executed, to transmit image signals from the electronic device to the base device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

For the embodiment below that is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
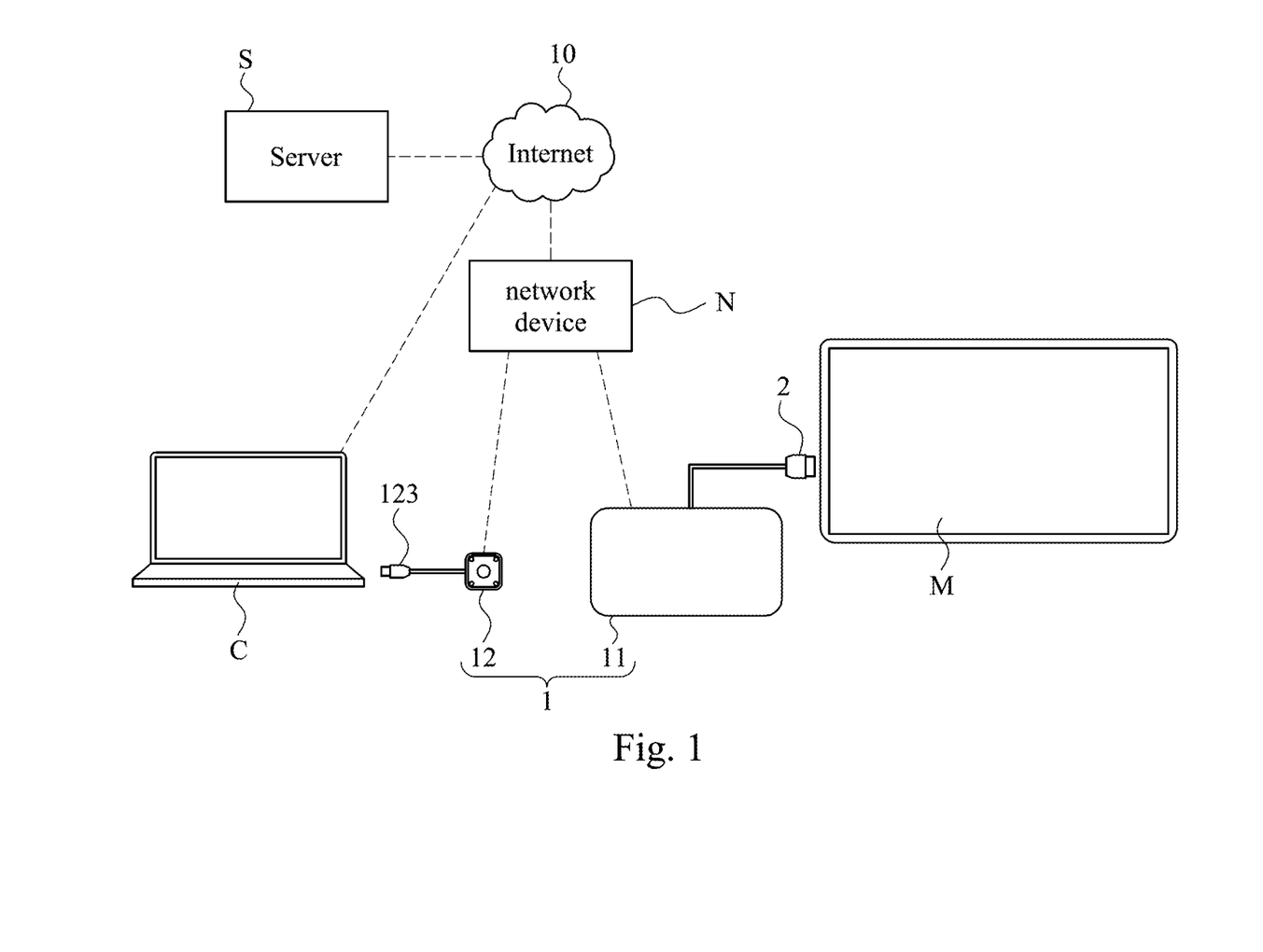
FIG. 1 is a schematic diagram which shows a corresponding relationship between the image transmission equipment 1 and the electronic device C, the display device M and the network device N.

The present disclosure discloses image transmission equipment and an image transmission method. Refer to the FIG. 1, FIG. 1 shows a corresponding relationship between the image transmission equipment 1 and the electronic device C (e.g., personal computer), the display device M and the network device N in some embodiments of the present disclosure. The image transmission equipment 1, a kind of wireless communication equipment, includes a base device 11 and a peripheral device 12. The base device 11 is electrically coupled to the display device M (e.g., HDMI plug coupled into a slot of a television), and an image transmission program is stored therein. The peripheral device 12 is electrically coupled to the electronic device C. As above, the image transmission equipment 1 is a kind of wireless communication equipment. That is, the wireless communication device can be configured to transmit various types of data, not limited to images.

The peripheral device 12 is capable of wirelessly communicating with the base device 11 to transmit the image transmission program from the base device 11 to the electronic device C so that the electronic device C stores the image transmission program. After the electronic device C executes the image transmission program, the electronic device C may transmit image signals to the display device M and synchronize the screen image of the electronic device C with the screen image on the display device M through the peripheral device 12 and the base device 11.

The image transmission equipment of the present disclosure has advantages of light volume and simple configuration. In addition, the electronic device C can obtain the image transmission program from an outside source existing outside the peripheral device (e.g., the base device 11 or a server S), and user only needs to simply plug the peripheral device 12 and the base device 11 into the electronic device C and the display device M, respectively, the electronic device C can automatically or manually execute the image transmission program and enable the display screen of the electronic device C to be synchronized to the display device M.

Figure 2:
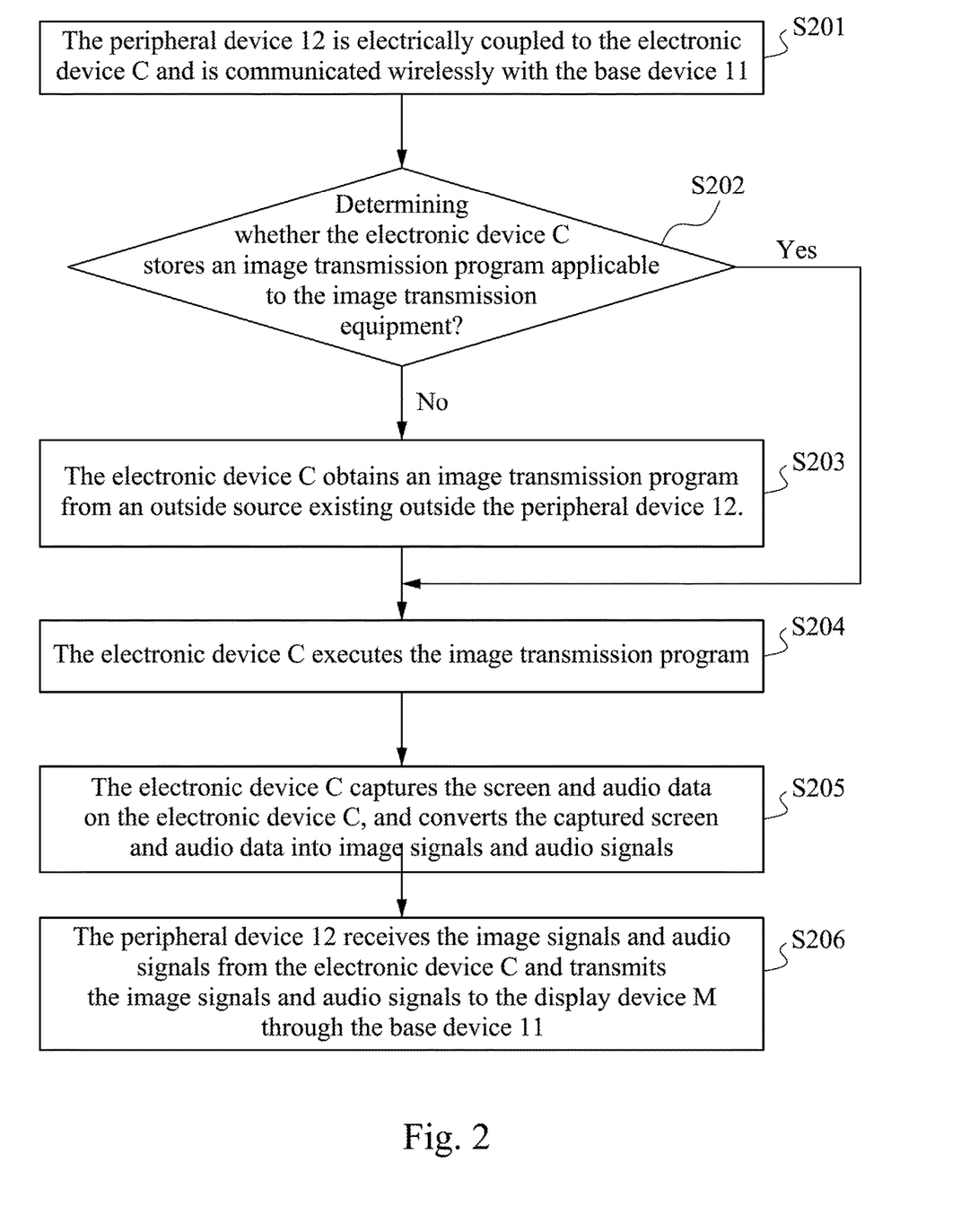
FIG. 2 is a flowchart illustrating an image transmission method in an embodiment of the present disclosure.

Refer to FIG. 2, which is a flow chart of the image transmission method of some embodiments of the present disclosure applied to the peripheral device 12. First, in step S201, the peripheral device 12 is electrically coupled to the electronic device C, and then, is communicated wirelessly with the base device 11.

In step S202, determining whether the electronic device C stores an image transmission program applicable to the image transmission equipment 1. If the electronic device C stores the image transmission program, performing the step S204. If the electronic device C does not store the image transmission program, performing the step S203 before performing the step S204. In step S203, the electronic device C obtains the image transmission program from an outside source existing outside the peripheral device 12. In the step S204, the electronic device C executes the image transmission program to transmit image signals from the electronic device C to the display device M through the image transmission equipment 1.

In some embodiments, the outside source exists in the base device 11, and the electronic device C obtains the image transmission program through a communication between the base device 11 and the peripheral device 12. In other some embodiments, the outside source may be the server S which is accessible through Internet 10, and the electronic device C may obtain the image transmission program from the server S through Internet 10 without passing through the peripheral device 12.

In step S205, after the electronic device C stores and executes the image transmission program, the image transmission program enables the electronic device C to capture the full screen (or designated screen) of the electronic device C, convert the captured screen into image signals, and further, can also capture the current audio data of the electronic device C and convert into audio signals. In some embodiments, the image transmission program may need to be installed in the electronic device C first, and then to be executed.

In step S206, the peripheral device 12 receives the image signals and audio signals from the electronic device C and transmits the image signals and audio signals to the display device M through the base device 11. The audio signals and image signals can be synchronized between the electronic device C and the display device M.

In some embodiments, if the peripheral device 12 detects that the electronic device C is unable to connect to Internet 10 or disconnects to Internet 10, the peripheral device 12 then requires the electronic device C to utilize the communication between the peripheral device 12 and the base device 11 to obtains the image transmission program from the base device 11. In particular, the peripheral device 12 serves as a bridge over the obtaining process and does not require a storage for the image transmission program. In this way, when the base device 11 is simultaneously connected to multiple peripheral devices 12, it also avoids a transmission error due to the mismatch between the image transmission program among the peripheral devices 12 and the base device 11.

The above describes the core technology and core steps of the image transmission equipment 1. In order to give a more specific understanding of the present disclosure to people in the field of technology, other some embodiments of the image transmission equipment 1 are described herein in detail.

The communication between the peripheral device 12 and the base device 11 can be established by direct connection, such as WiFi HotSpot mode or Bluetooth), or by indirect connection through an internal network or a local area network through a network device N, like FIG. 1 shown. Also referring to FIGS. 1 and 3, in this embodiment, the base device 11 includes a first processor 111, a first memory 112, a first connection port 113, a first wireless module 114 and a second connection port 115. The first memory 112, the first connection port 113, the first wireless module 114 and the second connection port 115 are electrically coupled to the first processor 111, respectively. The peripheral device 12 includes a second processor, a second memory 122, a second connector 123, and a second wireless module 124. The second memory 122 the second connector 123 and the second wireless module 124 are electrically coupled to the second processor 121 respectively.

Figure 3:
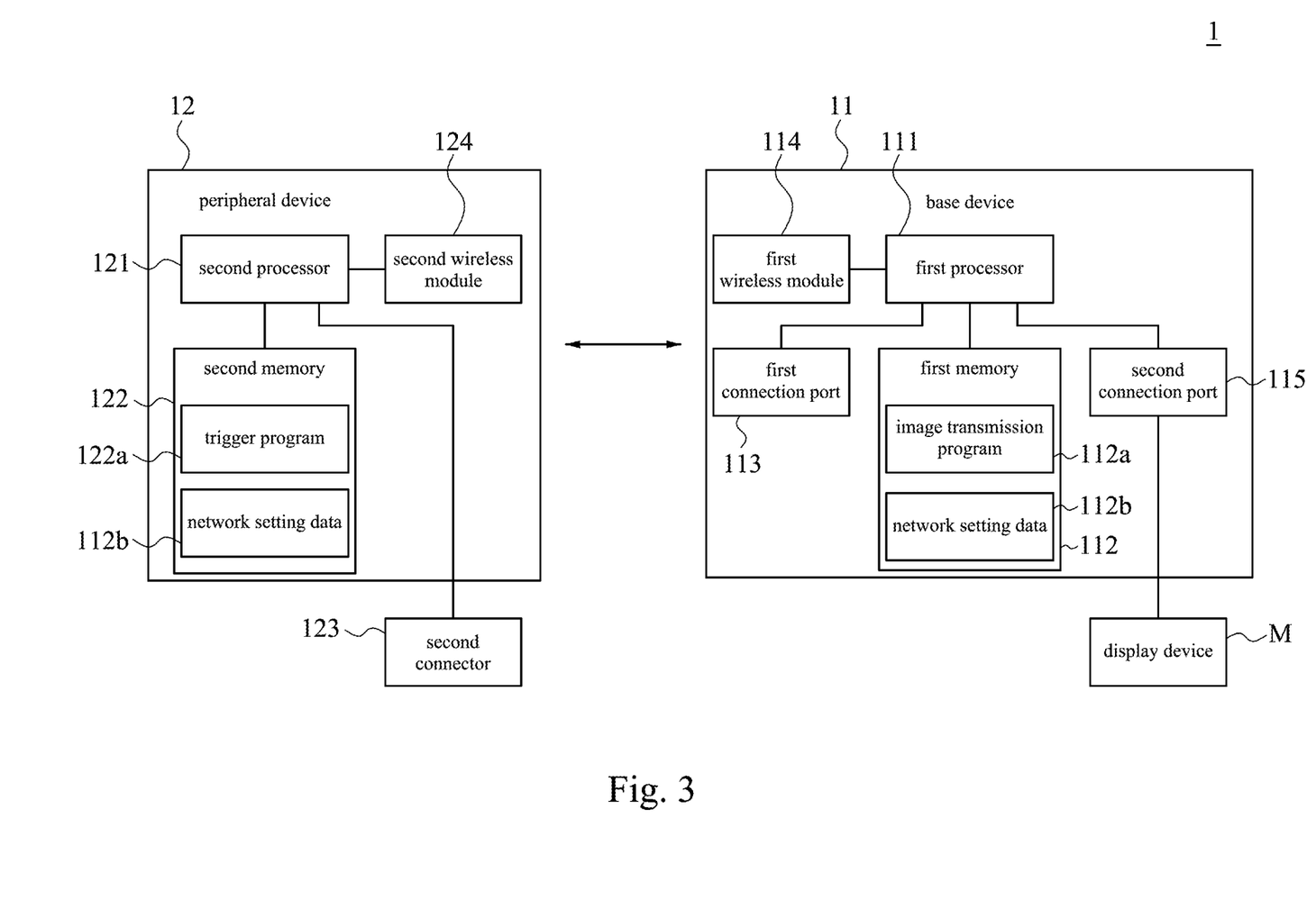
FIG. 3 is a schematic diagram of image transmission equipment in an embodiment of the present disclosure.

In one embodiment, in order for the base device 11 to be connected to the network device N, the user electrically connects the second connection port 115 of the base device 11 to the display device M (e.g., through a HDMI transmission line 2) so as to display internal information of the base device 11 on the display device M. Then, the user can use an input device, such as a mouse, keyboard or a remote controller, to set a proper network setting data (e.g., network name and password) and store the network settings data in the first memory 112. Thus the base device 11 can communicate with the network device N through the network setting data.

After the base device 11 is connected to the network device N, the peripheral device 12 can get the network setting data by pairing itself and the base device 11. In one embodiment, the user electrically connects the first connection port 113 (e.g., USB slot) of the base device 11 to the second connector 123 (e.g., USB connector) for data transmission.

As above, when the second processor 121 determines that the base device 11 and the peripheral device 12 are electrically coupled through the second connector 123, the second processor 121 transmits a request signal to the first processor 111 so that the first processor 111 transmits the network setting data 112b back to the second processor 121. After the second processor 121 receives the network setting data 112b, the peripheral device 12 can store the network setting data 112b in the second memory 122. Afterward, the base device 11 and the peripheral device 12 can be separated. When the peripheral device 12 is plugged into the electronic device C, the peripheral device 12 will wirelessly connect to the network device N, and the communication between the peripheral device 12 and the base device 11 will be established via the network device N.

Alternatively, direct wireless connection between the base device 11 and the peripheral device 12 without using the network device N also can be utilized by configuring the base device 11 operating in "Hotspot" mode. When the first connection port 113 is electrically connected to the second connector 123, the first processor 111 can also transmit the network setting data 112b to the second processor 121 and stored in the second memory 122. When the peripheral device 12 is plugged into the electronic device C, the peripheral device 12 will be able to establish a wireless connection directly with the base device 11 based on the network setting data 112b stored in the second memory 122.

In one embodiment, the second memory 122 stores a trigger program 122a. When the peripheral device 12 is electrically connected to the electronic device C, the electronic device C can execute the trigger program 122a and perform actions including: "determining whether the image transmission program is stored in the electronic device stores C," and "determining whether the electronic device C is able to connect to the Internet 10".

In one embodiment, if the electronic device C has not stored the image transmission program, and can connect to the Internet 10, the trigger program 122a will cause the electronic device C to download the image transmission program from the server S through the Internet 10. If the electronic device C has not stored the image transmission program 112a and is not connected to the Internet 10, the electronic device C obtains the image transmission program 112a from the base device 11 through the communication between the base device 11 and the peripheral device 12.

In addition, since it is common that electronic devices can have firmware or software updated periodically, when the electronic device C executes the image transmission program 112a, the image transmission program 112a will determine whether there is a newer version of the image transmission program in the outside source which is not identical to its version (the image transmission program in the electronic device C). if the image transmission program 112a determines the newer version of the image transmission program in the outside source is not identical to its version, the electronic device C will obtain the newer version of the image transmission program and replace the image transmission program in the electronic device in response to an update command.

In some embodiments, for example, the image transmission program 112a will compare its version with the Server's version. If the Server's version is newer than the one stored in the electronic device C, the electronic device C, up to user's choice, will update the image transmission program through the Internet 10. If the electronic device C is unable to connect to the Internet 10, the image transmission program 112a will compare its version with base device's version. If the base device's version is newer than the one stored in the electronic device C, the electronic device C, up to user's choice, will update the image transmission program 112a through the communication between the base device 11 and the peripheral device 12.

Furthermore, to keep the base device 11 store the newer version of the image transmission program, the base device 11 will check whether its current version of the image transmission program is the newer version. The base device 11 can update its current version of the image transmission program through its own network connection function. In some embodiments, the base device 11 will compare the version of the image transmission program stored therein with the Server's version. If the Server's version is newer (or, newer) than the one stored in the base device 11, the base device 11 will update the image transmission program through the Internet 10. In the similar manner, the base device 11 may also update other firmware or software stored in the base device 11. Accordingly, the electronic device C can update the image transmission program 112a through the base device 11 or the Internet 10, and therefore, make sure that the image transmission equipment 1 works properly.

It should be noted that the user can manually decide where to obtain the image transmission program such as from the server S or the base device 11 to update the image transmission program stored in the electronic device C, and even when to update. This provides flexible operation choices to user for various performing circumstances. In some embodiments, the electronic device C detects whether the electronic device C is able to obtain the image transmission program through the Internet 10 so as to determine how to get the program or where to get the program. The electronic device C may download the image transmission program in response to a first user command on the condition that the electronic device C is able to obtain the image transmission program through the Internet 10. The electronic device C also may obtain the image transmission program from the base device 11 on the condition that the electronic device C is unable to obtain the image transmission program through the Internet 10 or in response to a second user command.

Figure 4:
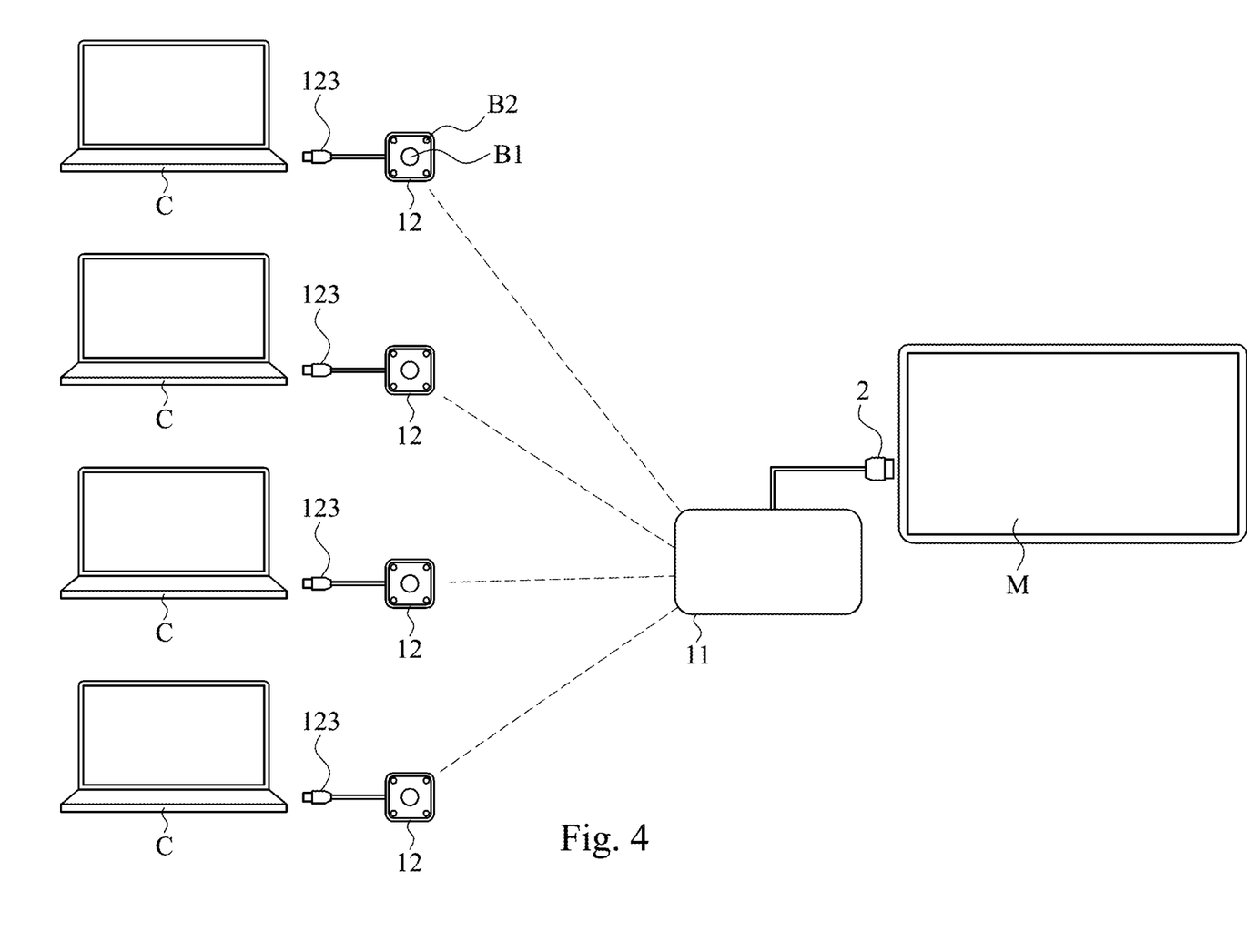
FIG. 4 is a schematic diagram of a one-to-multiple control mode of the image transmission equipment of the embodiment of the present disclosure.

Refer to FIG. 4, in some embodiments, the image transmission equipment 1 includes a base device 11 and a plurality of peripheral devices 12 so as to implement a one-to-multiple transmission method. The structure and characteristics of the base device 11 and the peripheral devices 12 are substantially the same as the foregoing embodiments and would not be restated herein. After executing the image transmission program, each electronic device C transmits the image signals to the display device M through the corresponding peripheral device 12 and the base device 11.

In some embodiments, the peripheral device 12 includes a first switch means to trigger the image signals transmission between the base device 11 and the peripheral device 12. The first switch means can be a button, knob, or touch switch. In one embodiment, every peripheral device 12 has a first switch button B1 to control and trigger the image transmission of the electronic device C. When the peripheral device 12 is plugged into the electronic device C, and the image transmission program is executed, the image signals will not be transmitted to the base device 11 immediately for lack of the first switch button's actuation. After the user presses and actuates the first switch button B1, the peripheral device 12 will transmit switch signal to the base device 11. If the base device 11 confirms the validity of the switch signal, then, the base device 11 will receives the image signals from the electronic devices C through the peripheral device 12.

Thus, in a meeting, when multiple users want to use their own electronic devices to share their own screens to the display device M, any user can press the first switch button B1 of the peripheral device 12 plugged to his/her electronic device C to transmit his/her screen image to the base device 11 and displayed on the display device M.

In some embodiments, the peripheral device 12 has a plurality of second switch means. Each of the second switch means is configured to trigger the image signals transmission between the base device 11 and the peripheral device 12, and indicate the image displaying position displayed on the display device. The second switch means can be a button, knob, or touch switch.

In another embodiment, the peripheral devices 12 further have multiple second switch buttons B2 arranged over the different areas of the peripheral device 12, each of which indicates the prospect of the image position displayed on the display device M in addition to the functions of the first switch button B1. When the peripheral device 12 is plugged into the electronic device C, and the image transmission program is executed, the image signals will not be transmitted to the base device 11 immediately for lack of the second switch button's actuation. After the user presses and actuates one of the second switch buttons B2, the peripheral device 12 will transmit a switch and segmentation signal to the base device 11. If the base device 11 confirms the validity of the switch and segmentation signal, then, the base device 11 will receive the image signal from the electronic devices C through the peripheral device 12. Simultaneously, the base device 11 will set up the displayed position of the image signal according to which second switch button be actuated, and then transmit the image signal to the display device M.

Figure 5:
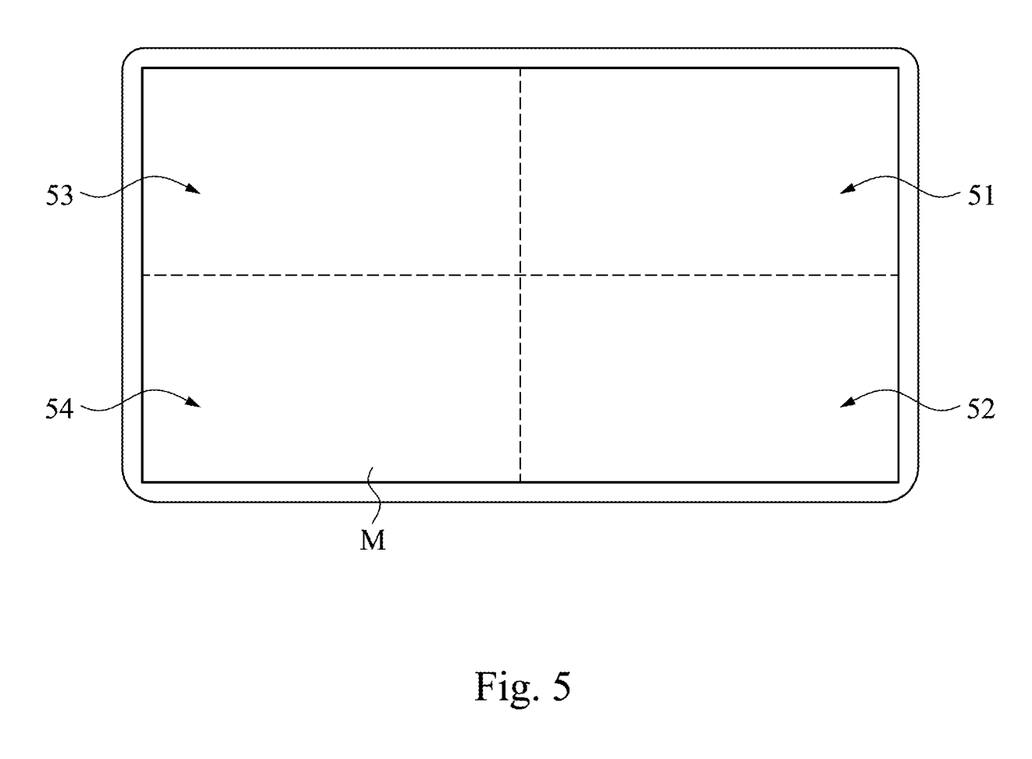
FIG. 5 is an integrated screen of the embodiment of the present disclosure in a one-to-multiple control mode.

For example, the peripheral device 12 may has four second switch buttons B2, arranged over the top surface of the peripheral device 12, respectively in the upper left, the upper right, the lower left and the lower right areas. Then above second switch buttons respectively correspond to upper left segmentation region 53, upper right segmentation region 51, lower left segmentation region 54 and lower right segmentation region 52 of the displayed screen of the display device M as shown in FIG. 5. When attending in a meeting, every attendee can share his/her own screens to the display device M by pressing one of the second switch button B2 of the peripheral device 12 plugged to his/her electronic device C to transmit his/her screen image to the base device 11 and displayed on the display device M. Because the different second switch buttons B2 of one peripheral device 12 indicate the different displayed position on the display device M, if the users respectively select the different second switch buttons B2 of their own peripheral devices 12, the display device M can displayed multiple users' screens in different positions at the same time.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An image transmission method, comprising:
electrically coupling a peripheral device of a wireless communication equipment to an electronic device and communicating the peripheral device with a base device of the wireless communication equipment, wherein the base device is electrically coupled to a display device;
determining whether an image transmission program applicable to the wireless communication equipment has been stored in the electronic device;
if the image transmission program has not been stored in the electric device, detecting whether the electronic device is able to obtain the image transmission program through internet;
if the electronic device is unable to obtain the image transmission program through the Internet and the image transmission program has not been stored in the electronic device, obtaining the image transmission program from an outside source existing outside the peripheral device, wherein the outside source exists in the base device and the image transmission program is obtained from the base device through a communication between the base device and the peripheral device on the condition that the electronic device is unable to obtain the image transmission program through Internet; and
executing the image transmission program to capture a screen of the electronic device and convert the captured screen into image signals, and transmitting the image signals from the electronic device, through the peripheral device and the base device, to the display device.

2. The image transmission method of claim 1, further comprising:
downloading the image transmission program in response to a first user command on the condition that the electronic device is able to obtain the image transmission program through the Internet;
obtaining the image transmission program from the base device in response to a second user command.

3. The image transmission method of claim 1, further comprising:
when executing the image transmission program in the electronic device, determining whether there is a newer version of the image transmission program in the outside source which is not identical to the image transmission program in the electronic device;
obtaining the newer version of the image transmission program and replacing the image transmission program in the electronic device in response to a update command if determining the newer version of the image transmission program in the outside source is not identical to the image transmission program in the electronic device.

4. The image transmission method of claim 1, wherein communicating the peripheral device and the base device of the wireless communication equipment further comprises:
communicating the base device to a network device according to a network setting data;
pairing the peripheral device and the base device to get the network setting data; and
communicating the peripheral device to the network device according to the network setting data to further establish the communication of the peripheral device and the base device.

5. An image transmission equipment, comprising:
a base device having an image transmission program stored therein and adapted to electrically coupled to a display device; and
a peripheral device adapted to electrically coupled to an electronic device, and capable of wirelessly communicating with the base device to transmit the image transmission program from the base device to the electronic device on the condition that the image transmission program has not been stored in the electronic device and the electronic device is unable to obtain the image transmission program through Internet, wherein while the image transmission program being executed, the image transmission program enables the electronic device to capture a screen of the electronic device and convert the captured screen into image signals, and the peripheral device is configured to transmit the image signals from the electronic device to the base device;

wherein the peripheral device stores a trigger program configured to detect whether the electronic device has stored the image transmission program, and detect whether the electronic device is able to obtain the image transmission program through the Internet.

6. The image transmission equipment of claim 5, wherein the image transmission program is able to check its version when being executed.

7. The image transmission equipment of claim 5, wherein a communication between the base device and the peripheral device is established by a network device.

8. The image transmission equipment of claim 5, wherein the peripheral device comprises a first switch means to trigger the image signals transmission between the base device and the peripheral device.

9. The image transmission equipment of claim 5, wherein the peripheral device has a plurality of second switch means, each of the plurality of second switch means is configured to trigger the image signals transmission between the base device and the peripheral device, and indicate the image displaying position displayed on the display device.

* * * * *